Dec. 13, 1949     A. BURROWS     2,491,085
DEVICE FOR FASTENING GASKETS TO CRANKCASES
Filed April 11, 1944
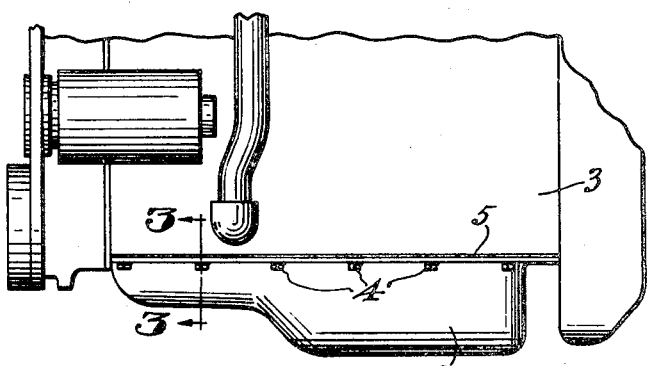
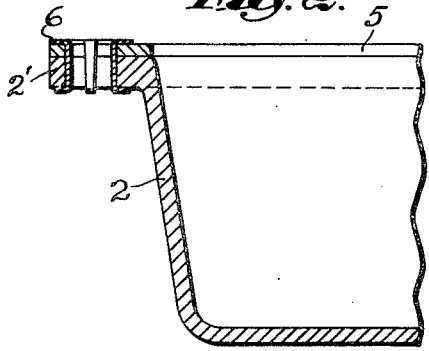
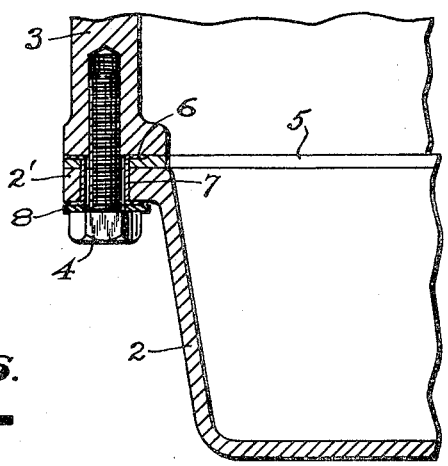
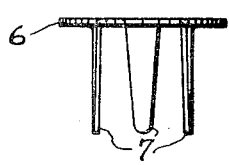
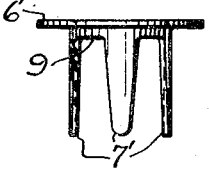
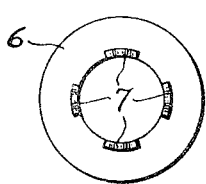
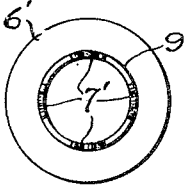
Inventor:
Allen Burrows
by J. H. McReady,
Attorney.

Patented Dec. 13, 1949

2,491,085

UNITED STATES PATENT OFFICE 2,491,085

DEVICE FOR FASTENING GASKETS TO CRANKCASES

Allen Burrows, Providence, R. I.

Application April 11, 1944, Serial No. 530,514

1 Claim. (Cl. 85—40)

In connection with the operation of over-hauling an internal combustion engine of a motor vehicle, it is usually found necessary to replace the gasket that is interposed between the upper edge of the crank case flange and the lower face of the cylinder block to which the crank case is bolted. These gaskets are usually made of a ground cork composition, or some similar sheet material, and it is a very troublesome matter to hold the gasket in place while the crank case is properly placed against the lower surface of the cylinder block and the first few bolts are thread-in to their respective holes. The usual procedure is to cement the gasket to the upper surface of the crank case flange, to allow the cement to set sufficiently to offer some resistance to displacement, and then to place it and bolt it to the block. However, this procedure is complicated by the fact that the gasket rather rarely fits exactly on the crank case so that its holes register with those in said flange, and it is expected, therefore, that some readjustment of the position of the gasket must be made during the bolting process. Moreover, at the time the crank case is initially brought into its proper position for fastening, the workman is lying under the car on his back with the crank case resting on his chest and stomach, and he must lift it into place, position it as best he can, and hold it there while he tries to get one bolt inserted through the crank case flange and started into the threaded hole in the cylinder block, with the threads properly caught, so that it can then be turned up. In the meantime, if the gasket has moved out of place, which usually happens, this fact adds greatly to the difficulties of getting that first bolt properly started. Later additional bolts are inserted, care being taken to adjust the gasket for each one, until enough of them are started into their respective holes to keep the gasket in its correct position while the rest are inserted and all of them are tightened up.

The present invention deals with the problem presented by these conditions, and it aims to devise a satisfactory solution for that problem.

The nature of the invention will be readily understood from the following description when read in connection with the accompanying drawings, and the novel features will be particularly pointed out in the appended claims.

In the drawings,

Fig. 1 is a side elevation of a portion of a crank case of an automobile, together with certain parts immediately associated with it;

Fig. 2 is a vertical, sectional view through the edge portion of the crank case;

Fig. 3 is a vertical, sectional view taken on the line 3—3 of Fig. 1;

Figs. 4 and 5 are side and bottom views, respectively, of a gasket fastening device made in accordance with this invention; and Figs. 6 and 7 are corresponding views of a modification of the device shown in Figs. 4 and 5.

Figure 1 shows a crank case 2 secured to the bottom of an engine cylinder block 3 by means of a series of bolts 4, as is customary.

This invention provides a special fastening device for securing the gasket 5 to the upper face of the crank case flange 2', one of these devices being used in as many holes as may be necessary in order to hold the gasket with its holes properly registered with those of the crank case.

As shown in Figs. 4 and 5, this fastening device comprises a thin flat head 6 from the inner edge of which a series of prongs or fingers project at approximately right angles to the head, the fingers preferably being spaced widely apart approximately equally around the hole in the head. Such a fastening device usually will be made of metal which may be relatively thin, say five or six thousandths of an inch in thickness, or it may be made of any other material having the necessary qualities of rigidity and pliability.

When the crank case is to be installed, the gasket is placed on the upper surface of the flange 2', and the fastening devices are inserted through the bolt holes and the registering holes in the gasket, one after the other, the ends of the fingers 7 of each device being bent over so as to cooperate with the head 6 in locking the portion of the gasket adjacent to the fastener to the corresponding section of the flange 2' with sufficient firmness to hold it definitely in place. If the gasket is warped or misshapen, or has shrunk, it should be straightened, smoothed down and pulled out, if necessary, sufficiently to make it lie flat with its holes registering with the respective holes in the crank case flange. Then the fastening devices are inserted either in all of the holes of the gasket, or at least in a sufficient number of them, to hold the gasket securely in place while it is being properly positioned against the lower end of the cylinder block 3 and the bolts 4 are being inserted through it. There is always a substantial clearness between the bolts 4 and the walls of the holes in the flange 2' so that a thin metal fastener, such as that shown in Figs. 4 and 5, can readily be accommodated without interfering at all with the bolts.

These fasteners may be inserted either in the manner shown in Fig. 2, or they may be put in with the legs pointing upward so that the heads 6 will bear against the lower surface of the flange 2'. If they are inserted as shown in Fig. 2, then a washer 8, Fig. 3, should be positioned between the bolt head and the bent-over ends of the fingers 7. A lock washer customarily is used at this point.

The fastening device illustrated in Figs. 6 and 7 is like that shown in Figs. 4 and 5 except that a short flange 9 is formed integral with the head 6' and the fingers 7' extend from the edge of this flange. The flange preferably is made somewhat greater in height than the thickness of the gasket so that it will project through the gasket and enter the hole in the metal of the flange 2'. The gaskets most commonly used are those of the cork composition type, and they almost always shrink during storage. In using one of them the mechanic pulls it out to the correct size so as to make all the holes register with those in the crank case, and by using these fasteners he can hold the gasket definitely in its stretched condition with its holes accurately lined up with those of the crank case flange. The type of fastener shown in Figs. 6 and 7 is especially effective in performing this function because the short cylindrical flange has ample strength for the job that it has to do, and the fingers or prongs simply are required to hold the fastener from dropping out of the hole. Thus even a gasket which has shrunk considerably can be held properly in place with these devices and made to register not only on the straight sections of the flange but also around the corners. This result has been impossible with any of the prior art devices of which I have been able to learn. When twine has been used for this purpose, as above described, it holds the gasket to the flange, but it does not register the gasket holes properly with those in the crank case flange. Furthermore, no tool is required in using these devices. The workman inserts them by hand and bends the prongs over with his fingers. The prongs are easily bent because they are thin, nearly flat, and relatively narrow.

These devices can be manufactured very economically and their use saves a great deal of time and trouble in installing a crank case in a motor vehicle. If made of thin metal their thickness does not interfere at all with the matter of producing a tight joint between the crank case and the cylinder block. As seen from Fig. 3, the fastening device when in position has its upper face flush with the upper face of the gasket and due to the fact that the thickness of the fastener, as previously stated, approximates five or six thousandths of an inch, the gasket will not be damaged or substantially deformed when the device is applied.

Having thus described my invention, what I desire to claim as new is:

A fastening device for positioning and retaining a sealing gasket on its flange during assembly of machine parts in which the flange and sealing gasket are each formed with registering openings for the passage of securing bolts, said fastening device including a pliable, flat, annular head and a plurality of prongs extending from the inner edge of said head in an annulus defined by a bolt opening, the said annular head being sufficiently thin to permit it to be imbedded in the sealing gasket with its upper face flush with the upper face of the gasket without damage or substantial deformation of the gasket body, and the prongs being of substantially the same thickness as the head and relatively widely spaced from each other and being sufficiently thin, non-resilient, and pliable so that they may be readily deflected by hand pressure to extend about the wall of a registering opening, the thickness of the prongs being so limited that they may be positioned in and occupy the space defined by the normal clearance between the bolt and the bolt opening and of sufficient strength to retain the associated parts in their proper relation.

ALLEN BURROWS.

REFERENCES CITED

The following references are of record in the file of this patent:

UNITED STATES PATENTS

| Number | Name | Date |
| --- | --- | --- |
| 327,515 | Bradley | Oct. 6, 1885 |
| 667,602 | Stirckler | Feb. 5, 1901 |
| 990,300 | Schlomer | Apr. 25, 1911 |
| 1,662,818 | Brotz | Mar. 20, 1928 |
| 1,813,678 | Randall | July 7, 1931 |
| 2,401,427 | Kimbell | June 4, 1946 |

FOREIGN PATENTS

| Number | Country | Date |
| --- | --- | --- |
| 472,946 | France | Aug. 26, 1914 |